United States Patent
Hibi et al.

(10) Patent No.: US 11,095,519 B2
(45) Date of Patent: Aug. 17, 2021

(54) NETWORK APPARATUS, AND METHOD FOR SETTING NETWORK APPARATUS

(71) Applicant: NIPPON TELEGRAPH AND TELEPHONE CORPORATION, Tokyo (JP)

(72) Inventors: Tomoya Hibi, Musashino (JP); Hitoshi Masutani, Musashino (JP); Hirokazu Takahashi, Musashino (JP); Junki Ichikawa, Musashino (JP); Toru Mano, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/255,057

(22) PCT Filed: Jun. 21, 2019

(86) PCT No.: PCT/JP2019/024727
§ 371 (c)(1),
(2) Date: Dec. 22, 2020

(87) PCT Pub. No.: WO2020/004270
PCT Pub. Date: Jan. 2, 2020

(65) Prior Publication Data
US 2021/0135945 A1  May 6, 2021

(30) Foreign Application Priority Data
Jun. 26, 2018 (JP) ............................. JP2018-120469

(51) Int. Cl.
*G06F 15/173* (2006.01)
*H04L 12/24* (2006.01)

(52) U.S. Cl.
CPC ...... *H04L 41/0893* (2013.01); *H04L 41/0866* (2013.01)

(58) Field of Classification Search
CPC .................... H04L 12/4641; G06F 9/45558
See application file for complete search history.

(56) References Cited

U.S. PATENT DOCUMENTS 6,430,634 B1 *  8/2002  Mito .................... G05B 19/042
                                                    710/100
2007/0263242 A1 * 11/2007 Takahashi ............. G06F 3/1254
                                                    358/1.14

(Continued)

OTHER PUBLICATIONS

Kunihiro Ishiguro et al., Zebra2.0 and Lagopus: newly-designed routing stack on high-performance packet forwarder, The Technical Conference on Linux Networking, Feb. 10, 2016.

(Continued)

*Primary Examiner* — Thanh T Nguyen

(57) ABSTRACT

An object of the present disclosure is to provide a network device and a method for setting the network device that can, in developing functional modules, perform abnormality detection based on statistical information and setting verification in consideration of a dependency relationship between the functional modules and statistical information and can address a change in a policy in the setting verification and a change in a condition in the abnormality detection. In the network device according to the present disclosure, an existing setting of each module, external information, a dependency relationship, and a policy are collected at one location (setting verification unit) by using a common language. When a new setting is made to the modules, a new dependency relationship is set, or new external information is acquired, the new setting is sent to the setting verification unit and checked against the existing setting, the external information, and the dependency rela- (Continued)

tionship. Then, when the new setting is in a normal range of the policy, the new setting is made to the modules.

8 Claims, 10 Drawing Sheets

(56) References Cited

U.S. PATENT DOCUMENTS

| | | | | |
|---|---|---|---|---|
| 2007/0288623 | A1* | 12/2007 | Kato | H04L 63/102 |
| | | | | 709/223 |
| 2008/0010489 | A1* | 1/2008 | Kawamoto | G06F 11/1076 |
| | | | | 714/4.1 |
| 2012/0075020 | A1* | 3/2012 | Tseng | H04L 25/0278 |
| | | | | 330/207 P |
| 2015/0329121 | A1* | 11/2015 | Lim | H04W 4/027 |
| | | | | 701/36 |
| 2016/0094700 | A1* | 3/2016 | Lee | H04W 8/245 |
| | | | | 455/419 |
| 2016/0296176 | A1* | 10/2016 | Mu | A61B 5/1112 |
| 2017/0285839 | A1* | 10/2017 | Haryu | H05K 7/1467 |
| 2017/0300329 | A1* | 10/2017 | Noguchi | G06F 9/30087 |
| 2018/0132031 | A1* | 5/2018 | Seo | H04R 1/1041 |
| 2018/0183252 | A1* | 6/2018 | Kim | H02J 7/04 |
| 2018/0287224 | A1* | 10/2018 | Ryoo | G01N 29/07 |
| 2019/0243333 | A1* | 8/2019 | Yoon | G05B 23/02 |
| 2020/0095807 | A1* | 3/2020 | Yasuda | A45C 13/103 |
| 2020/0165996 | A1* | 5/2020 | Goto | F02D 41/22 |
| 2020/0182180 | A1* | 6/2020 | Goto | F02D 41/04 |
| 2020/0193990 | A1* | 6/2020 | Yamada | G10L 15/285 |
| 2020/0202888 | A1* | 6/2020 | Yoshikawa | H04M 1/72475 |
| 2020/0211548 | A1* | 7/2020 | Yoshikawa | G10L 15/22 |
| 2020/0410980 | A1* | 12/2020 | Yamada | G06F 3/16 |
| 2021/0049331 | A1* | 2/2021 | Yang | H04B 1/3816 |
| 2021/0119870 | A1* | 4/2021 | Hu | H04L 41/5009 |

OTHER PUBLICATIONS

Fogel Ari et al., A General Approach to Network Configuration Analysis, Proceedings of the 12th USENIX Symposium on Networked Systems Design and Implementation, Mar. 4, 2015.
Openstack Congress, literature, Jun. 1, 2018 (Reading Day), https://wiki.openstack.org/wiki/Congress.
Datalog User Manual, literature, Jun. 1, 2018 (Reading Day), http://datalog.sourceforge.net/datalog.html.

\* cited by examiner

```
{8}
set interfaces interface if0 config mtu 1514
set interfaces interface if0 config driver dpdk
set interfaces interface if0 config device 0000:05:00.0
set interfaces interface if0 config type ethernetCsmacd
set interfaces interface if0 subinterfaces subinterface 0 config enabled true
set interfaces interface if0 subinterfaces subinterface 0 ipv4 addresses address 172.16.110.1 config prefix-length 24
set interfaces interface if0 config enabled true set interfaces interface if1 config mtu 1514
set interfaces interface if1 config driver dpdk
set interfaces interface if1 config device 0000:05:00.1
set interfaces interface if1 config type ethernetCsmacd
set interfaces interface if1 subinterfaces subinterface 0 ipv4 addresses address 10.10.0.1 config prefix-length 24
set interfaces interface if1 subinterfaces subinterface 0 config enabled true
set interfaces interface if1 config enabled true network-instance vrf1
set network-instances network-instance vrf1 config type L3VRF
set network-instances network-instance vrf1 config enabled true
set network-instances network-instance vrf1 config enabled-address-families IPV4
set network-instances network-instance vrf1 interfaces interface if0 subinterface 0
set network-instances network-instance vrf1 interfaces interface if1 subinterface 0
...
```

Fig. 8

[9]
set interfaces interface if0 config mtu 1514
set interfaces interface if0 config driver dpdk
set interfaces interface if0 config device 0000:03:00.0
set interfaces interface if0 config type ethernetCsmacd
set interfaces interface if0 subinterfaces subinterface 0 config enabled true
set interfaces interface if0 subinterfaces subinterface 0 ipv4 addresses address 172.16.110.1 config prefix-length 24
set interfaces interface if0 config enabled true ←----------------NO SETTING OF if1 network-instance vrf1
set network-instances network-instance vrf1 config type L3VRF
set network-instances network-instance vrf1 config enabled true
set network-instances network-instance vrf1 config enabled-address-families IPV4
set network-instances network-instance vrf1 interfaces interface if0 subinterface 0
<u>set network-instances network-instance vrf1 interfaces interface if1 subinterface 0</u>
if1 IS NOT DEFINED

Fig. 9

[10]
set interfaces interface if0 config mtu 1514
set interfaces interface if0 config driver dpdk
set interfaces interface if0 config device 0000:05:00.0
set interfaces interface if0 config type ethernetCsmacd
set interfaces interface if0 subinterfaces subinterface 0 config enabled true
set interfaces interface if0 subinterfaces subinterface 0 ipv4 addresses address 172.16.110.1 config prefix-length 24
set interfaces interface if0 config enabled true set interfaces interface if1 config mtu 1514
set interfaces interface if1 config driver dpdk
set interfaces interface if1 config device 0000:05:00.1
set interfaces interface if1 config type ethernetCsmacd
set interfaces interface if1 subinterfaces subinterface 0 ipv4 addresses address 10.10.0.1 config prefix-length 24
set interfaces interface if1 subinterfaces subinterface 0 config enabled true
set interfaces interface if1 config enabled true network-instance vrf1
set network-instances network-instance vrf1 config type L3VRF
set network-instances network-instance vrf1 config enabled true
set network-instances network-instance vrf1 config enabled-address-families IPV4
set network-instances network-instance vrf1 vlans vlan 100 config status ACTIVE  ←―― IN SPITE OF LACK OF VLAN FUNCTION,
set network-instances network-instance vrf1 interfaces interface if0 subinterface 0       VLAN IS SET TO NETWORK INSTANCE
set network-instances network-instance vrf1 interfaces interface if1 subinterface 0       OF TYPE L3VRF
...

Fig. 10

NETWORK APPARATUS, AND METHOD FOR SETTING NETWORK APPARATUS

CROSS-REFERENCE TO RELATED APPLICATIONS

This application is a 371 U.S. National Phase of International Application No. PCT/JP2019/024727, filed on Jun. 21, 2019, which claims priority to Japanese Application No. 2018-120469 filed on Jun. 26, 2018. The entire disclosures of the above applications are incorporated herein by reference.

TECHNICAL FIELD

The present disclosure relates to network devices provided with a plurality of modules for processing a plurality of protocols, and a method for setting the network devices.

BACKGROUND ART

To manage setting information and detect abnormalities, network devices provided with a plurality of modules for processing a plurality of protocols include a setting management unit and a statistical information processing unit in a unified manner, or include a setting/statistical information management mechanism for each of the functional modules. In such a configuration, setting verification in consideration of a dependency relationship and statistical information in each module is complicated as it is necessary that a unified management module perform the verification, or that each functional module collect information about other modules and solve the dependency relationship. Furthermore, with the recent diversification of use cases, there is a need for verification and abnormality detection in consideration of not only the system alone, but also the dependency relationship on an external environment, including a temperature and locational information.

CITATION LIST

Non Patent Literature

Non Patent Literature 1: Kunihiro Ishiguro, Yoshihiro Nakajima, Masaru Oki, Hirokazu Takahashi, "Zebra 2.0 and Lagopus: newly-designed routing stack on high-performance packet forwarder", Proceedings of NetDev 1. 1: The Technical Conference on Linux Networking (February 2016, Seville, Spain).

Non Patent Literature 2: Fogel, A., Fung, S., Pedrosa, L., Walraed-Sullivan, M., Govindan, R., Mahajan, R., & Millstein, T. D., "A General Approach to Network Configuration Analysis", Proceedings of the 12th USENIX Symposium on Networked Systems Design and Implementation (NSDI☐15) (May 2015, Oakland, Calif., USA).

Non Patent Literature 3: Openstack Congress, https://wiki.openstack.org/wiki/Congress (Searched on Jun. 11, 2018)

Non Patent Literature 4: Datalog User Manual, http://www.ccs.neu.edu/home/ramsdell/tools/datalog/datalog.html (Searched on Jun. 11, 2018)

SUMMARY OF THE INVENTION

Technical Problem

For example, in OpenConfigd project (see Non Patent Literature 1), the Openconfigd module collectively manages setting information about a plurality of functional modules. However, in OpenConfigd, setting abnormality can be verified only to the extent that can be described in the data model description language referred to as YANG, and when setting validation or abnormality detection of each functional module is performed for the implementation, the dependency relationship between the plurality of different functional modules and statistical information are not considered. Thus, in considering the dependency relationship between the modules in the OpenConfigd project, there is a first problem in that the module configuration is complicated because each module needs to include means for solving the dependency relationship between the modules.

On the other hand, in verifying the consistency of setting contents, Fogel et al. proposes, as verification of a network including a plurality of devices, a technique of collecting Config information and network topology information from each device, and verifying whether the settings of the entire network are correct by using Datalog (see, for example, Non Patent Literature 2). Similar techniques have also been applied in Congress of OpenStack (see, e.g., Non Patent Literature 3). In Congress, the setting elements of a plurality of functional components in OpenStack are collected, and whether the setting elements conform to the policy described in Datalog is verified. However, these techniques are intended for the entire network or the entire OpenStack and cannot be applied to a single device, and only setting information can be verified. In other words, there is a second problem in that the techniques in Non Patent Literatures 2 and 3 cannot verify setting contents of individual devices or modules.

In monitoring network devices, a variety of statistical information is collected, and traffic is controlled when certain statistical information exceeds a threshold. However, in the device including a plurality of functional modules, it is possible to address the abnormality of statistical information from each of the functional modules, while it is difficult to detect the abnormality of statistical information related to the plurality of functional modules. In addition, although statistical information about other devices is also important as a value for abnormality detection, there is no function of detecting the abnormality of the statistical information about the other devices. In other words, the current technology has a third problem in that abnormality cannot be detected based on statistical information related to a plurality of functional modules and statistical information about other devices.

As described in the above-mentioned first to third problems, in developing each functional module, the current technology cannot perform abnormality detection based on statistical information or setting verification in consideration of the dependency relationship between the functional modules and the statistical information. In particular, to change a policy in the setting verification or a condition in the abnormality detection, it is necessary to modify the related multiple modules, and such a modification is difficult to achieve. Therefore, to solve the above problems, an object of the present disclosure is to provide a network device and a method for setting the network device that can, in developing functional modules, perform abnormality detection based on statistical information and setting verification in consideration of the dependency relationship between the functional modules and the statistical information and that can address a change in a policy in the setting verification and a change in a condition in the abnormality detection.

Means for Solving the Problem

To achieve the above object, in the network device according to the present disclosure, an existing setting of each module, external information, a dependency relationship, and a policy are collected by using a common language (e.g., Datalog) in one location (setting verification unit). When a new setting is made to the modules, a new dependency relationship is set, or new external information is acquired, the new setting is sent to the setting verification unit is checked against the existing setting, the external information, and the dependency relationship. Then, when the new setting is in a normal range of the policy, the new setting is made to the modules.

Specifically, a network device according to the present disclosure is a network device including a plurality of functional modules for processing a plurality of respective protocols, the network device including
a setting management unit configured to manage an existing setting registered in the functional modules and a new setting to be newly registered in the functional modules by using a common language,
a statistical information management unit configured to acquire statistical information about a module-related state related to the functional modules and manage the acquired statistical information by using the common language; and
a setting verification unit configured to manage a dependency relationship between the functional modules and a policy of a network by using the common language, perform a verification operation of checking that the new setting is in a normal range of the policy in relation to the dependency relationship, the existing setting, and the statistical information, and input the new setting to the functional modules when the new setting is in the normal range of the policy.

A method for setting a network device according to the present disclosure is a method for setting a network device including a plurality of functional modules for processing a plurality of respective protocols, the method including
managing an existing setting registered in the functional modules and a new setting to be newly registered in the functional modules by using a common language;
performing statistical information management by acquiring statistical information about a module-related state related to the functional modules and managing the acquired statistical information by using the common language; and
performing setting verification by managing a dependency relationship between the functional modules and a policy of a network by using the common language, performing a verification operation of checking that the new setting is in a normal range of the policy in relation to the dependency relationship, the existing setting, and the statistical information, and inputting the new setting to the functional modules when the new setting is in the normal range of the policy.

The network device includes the "setting management unit" (corresponding to conventional Openconfigd) that collectively manages the setting information about each functional module, the "statistical information management unit" that acquires the statistical information about each functional module and the various statistical information about the network device itself, and the "setting verification unit" that verifies the validity of the setting of each functional module based on the input dependency relationship, and detects and notifies an abnormality. Then, the setting verification unit uses the setting information about each functional module, which is acquired from the setting management unit, and the statistical information acquired from the statistical information management unit to determine whether the setting of each functional module is valid. In this manner, the network device can determine whether the setting of individual functional modules is valid in consideration of the relationship with other functional modules and the statistical information.

Thus, the present disclosure can provide a network device and a method for setting the network device that can, in developing functional modules, perform abnormality detection based on statistical information and setting verification in consideration of the dependency relationship between the functional modules and the statistical information and that can address a change in a policy in the setting verification and a change in a condition in the abnormality detection.

When the dependency relationship is newly registered, the setting verification unit of the network device according to the present disclosure performs a verification operation of checking that the existing setting and the statistical information are in a normal range of the policy in the newly registered dependency relationship, and notifies that the existing setting or the statistical information is abnormal when the existing setting and the statistical information are not in the normal range of the policy.
The network device can also address changes in the dependency relationship between the functional modules.

When the policy is newly registered, the setting verification unit of the network device according to the present disclosure performs a verification operation of checking that the existing setting and the statistical information are in a normal range of the newly registered policy in the dependency relationship, and notifies that the existing setting or the statistical information is abnormal when the existing setting and the statistical information are not in the normal range of the newly registered policy.
The network device can also address changes in the network policy.

When receiving, from the statistical information management unit, a notification that a change in the module-related state is detected, the setting verification unit of the network device according to the present disclosure causes the setting management unit to acquire the existing setting registered in the functional modules, performs a verification operation of checking that the existing setting and the changed statistical information are in a normal range of the policy in the dependency relationship, and notifies that the module-related state is abnormal when the existing setting and the changed statistical information are not in the normal range of the policy.
The network device can perform the abnormality detection based on the dependency relationship between the functional modules and the statistical information.

Effects of the Invention

With such a configuration, the network device according to the present disclosure can perform setting validation and abnormality detection in consideration of a dependency relationship and statistical information in functional modules. In addition, in the network device according to the present disclosure, the dependency relationship between the functional modules, a rule for performing the setting validation/abnormality detection can be easily changed, thereby enabling flexible operations.

As described above, the present disclosure can provide a network device and a method for setting the network device that can perform, in developing functional modules, abnormality detection based on statistical information and setting verification in consideration of a dependency relationship and the statistical information of each functional module, and that can also address a change in a policy in the setting verification and a change in a condition in the abnormality detection.

BRIEF DESCRIPTION OF DRAWINGS

FIG. 8 is a diagram illustrating an example of settings input to functional modules.

FIG. 9 is a diagram illustrating an example of settings input to the functional modules.

FIG. 10 is a diagram illustrating an example of settings input to the functional modules.

DESCRIPTION OF EMBODIMENTS

Hereinafter, embodiments of the present disclosure will be described with reference to the drawings. The embodiments described below are examples of the present disclosure, and the present disclosure is not limited to the following embodiments. In this specification and the drawings, constituent elements having the identical reference signs are assumed to be the same.

Definition

Functional Module:
Most of network devices have a modular configuration to process various protocols. Functional modules refer to portions for executing the processing of the various protocols. The functional module may be a physical circuit or may be virtually formed. Examples of the module include a module for processing DHCP and a module for processing BGP.
Datalog:
As with Prolog or the like, Datalog is a declarative logic language based on the first-order predicate logic. Datalog is also used as a query language such as SQL used for databases. Datalog is similar to Prolog, but is limited in several functions to ensure termination properties and the like.
Trap:
Trap is synonymous with abnormality detection. This is a mechanism of notifying an abnormality when the abnormality occurs at an observed location (above a set value, below a set value, or flow of an abnormal packet).
Rollback:
Rollback is to return a setting to the state immediately prior to a change when the setting change fails.
Statistical Information About Functional Modules:
Statistical information is information such as the number of processes performed by each functional module, a delay, a connection status, and counters acquired by various protocols such as SNMP. Examples of the statistical information includes the status of the Link Up/Down of Ethernet (registered trademark), the throughput and delay of a particular device/communication path, the final update date and time of a setting, the status of a keep alive, a delay, the number of entries in an IP routing table, an ARP table, or the like, a counter for each entry, an entry survival time, neighbor information such as BGP.

Configuration of Network Device

Figure 1:
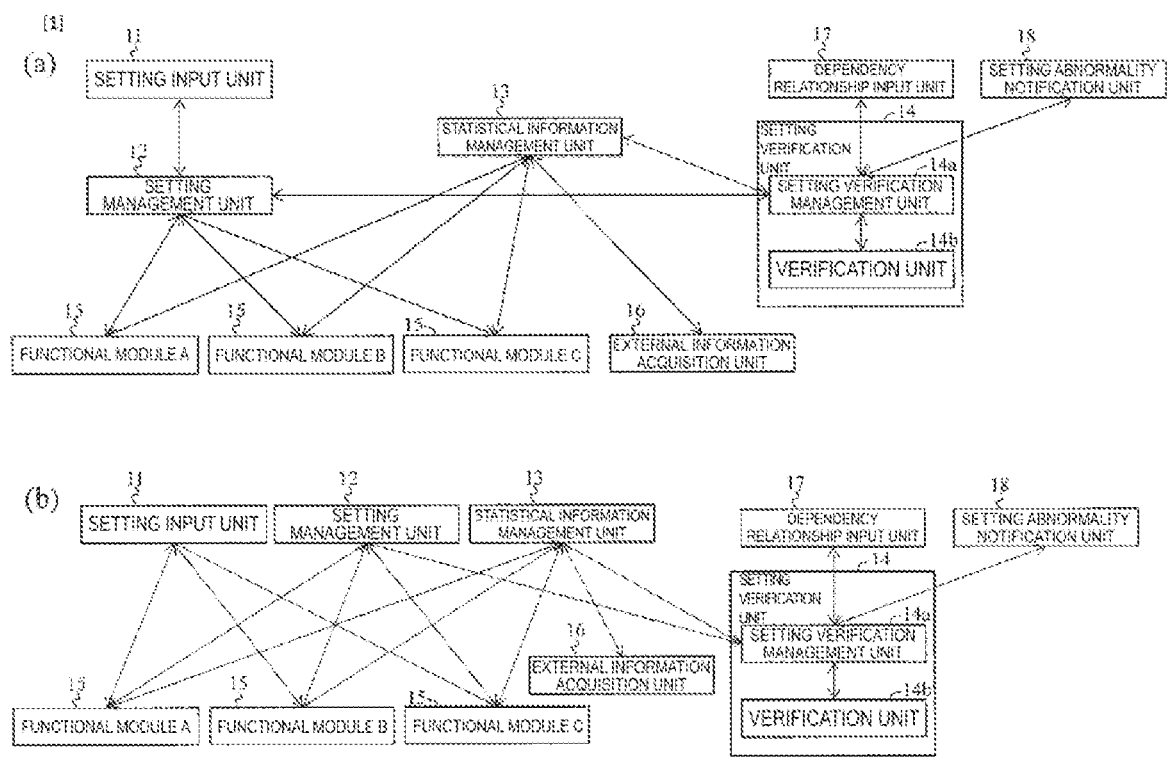
FIG. 1 is a block diagram illustrating a network device according to the present disclosure.

FIG. 1 is a block diagram illustrating a network device according to the present embodiment. The network device includes a plurality of functional modules 15 for processing a plurality of protocols, and further includes a setting management unit 12, a statistical information management unit 13, and a setting verification unit 14.

The setting management unit 12 manages an existing setting registered in the functional modules 15 and a new setting newly registered in the functional modules 15, by using a common language.

The statistical information management unit 13 acquires statistical information about module-related states associated with the functional modules 15 and manages the statistical information by using the common language.

The setting verification unit 14 manages the dependency relationship between the functional modules 15, and a network policy by using the common language, performs a verification operation of checking that the new setting is in a normal range of the policy in relation to the dependency relationship, the existing setting, and the statistical information, and inputs the new setting to the functional modules 15 when the new setting is in the normal range of the policy.

The network device further includes a setting input unit 11 for an operator to input the new setting to each functional module 15, a dependency relationship input unit 17 for the operator to input a new dependency relationship or a policy to the network device, an external information acquisition unit 16 described below, and a setting abnormality notification unit 18.

The setting verification unit 14 includes a setting verification management unit 14a and a verification unit 14b. The setting verification management unit 14a receives the setting information, the dependency relationship, and the statistical information, inputs them to the verification unit 14b, and notifies each unit of a verification result. The verification unit 14b actually performs verification by using the common language (such as Datalog) to verify whether the setting information, the statistical information, the external information or the policy is correct.

To perform setting verification and abnormality detection in consideration of the dependency relationship and the statistical information of the plurality of different functional modules 15, the network device includes the setting management unit 12 and the statistical information management unit 13 as illustrated in FIG. 1(a). As illustrated in FIG. 1(b), the network device may be configured such that the setting is directly input to each functional module 15, and the setting management unit 12 and the statistical information management unit 13 collect the setting information and the statistical information respectively from each functional module 15.

The network device may collect, as the statistical information, not only the statistical information about each functional module 15, but also data as described below from the external information acquisition unit 16.

Data Example 1) Statistical information about a network device machine (statistical information acquired from an OS and the like, authentication information, CPU activity ratio, memory activity ratio, disk I/O speed, usage of network band, various errors, and the like)

Data Example 2) In the case in which the network device is a virtual machine, statistical information about a host machine (statistical information acquired from an OS and the like, the number and usage capacity of other virtual machines and containers, CPU activity ratio, memory activity ratio, memory error, disk I/O speed, disk error, network usage, and the like)

Data Example 3) Statistical Information about a physical machine of the network device that operates (temperature, humidity, power consumption, and the like)

Input and Verification of Setting

Figure 2:
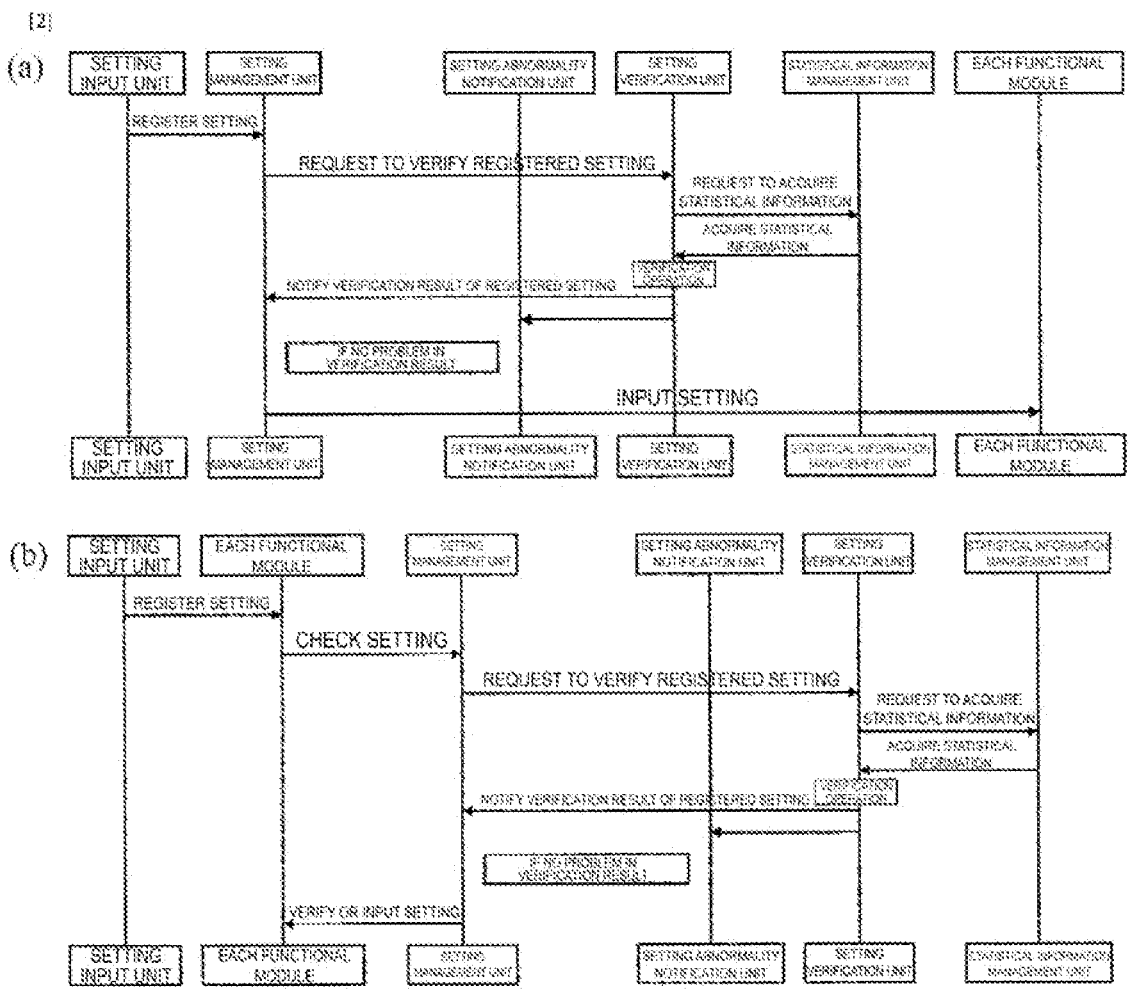
FIG. 2 is a sequence diagram illustrating operations of the network device according to the present disclosure.

FIG. 2 is a diagram illustrating a sequence when a setting is input to the functional modules 15. FIG. 2(a) is a sequence diagram of the network device in FIG. 1(a), and FIG. 2(b) is a sequence diagram of the network device in FIG. 1(b). The setting is input from the setting input unit 11 to each functional module 15. In the network device in FIG. 1(a), the input setting is managed by the setting management unit 12. In the network device in FIG. 1(b), the input setting is input to each functional module 15 and then, the setting is notified from each functional module 15 to the setting management unit 12. The setting input to the setting management unit 12 is sent to the setting verification unit 14. The setting verification unit 14 receives statistical information from the statistical information management unit 16, and performs setting verification of setting abnormality and policy violation due to the dependency relationship in consideration of the statistical information (setting verification will be described later). The result is returned to the setting abnormality notification unit 18 and the setting management unit 12. The setting abnormality notification unit 18 notifies the setting abnormality and cooperates with other systems to, for example, stop the system and roll back the setting. The setting management unit 12 does not input the setting when the setting abnormality is found. Here, the setting management unit 12 may notify the operator that no setting is input to the functional modules 15.

For example, in the configuration as illustrated in FIG. 1(a), the setting verification unit 14 can be connected as necessary to a system such as OpenConfigd including the setting management unit 12 that perform setting verification in advance.

A system which includes a plurality of functional modules and in which the setting operation on the plurality of functional modules is controlled by the setting management unit may have a function in which the setting management unit causes all of the related functional modules to verify the setting contents at the time of setting verification. Then, in a case where at least one functional module returns an error, the setting management unit determines that the setting to be input is incorrect and causes a validation error.

Figure 3:
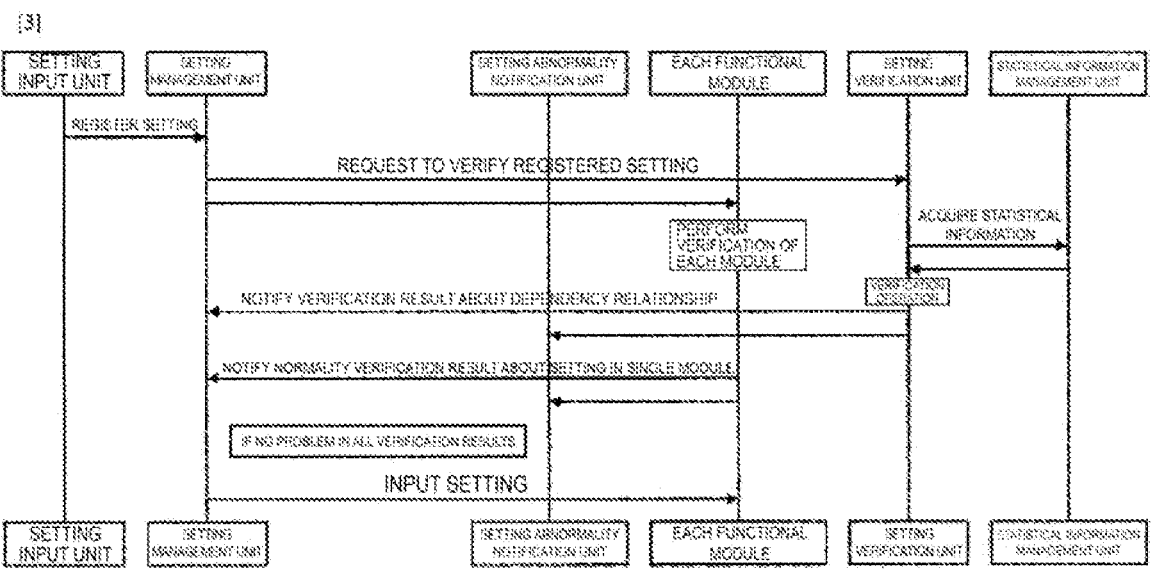
FIG. 3 is a sequence diagram illustrating operations of the network device according to the present disclosure.

The network device may also use the following function. That is, using that the setting management unit determines an error when there is even one error in the modules, the network device causes each functional module 15 to verify the functional module itself, and the setting verification unit 14 to verify settings related to the dependency relationship, the operation policy, and the statistical information. A sequence of such verification is illustrated in FIG. 3.

In addition, the network device allows rules (dependency relationship or policy) of setting verification and abnormality detection to be optionally changed or added. When a new rule is added, the network device may determine whether the setting and the statistical information of each functional module at this time are normal under the new rule.

Specifically, the setting verification unit 14 is characterized in that it performs the following processing. When the dependency relationship is newly registered, the setting verification unit 14 performs a verification operation of checking that the existing setting and the statistical information are in a normal range of the policy in the newly registered dependency relationship. Further, when the existing setting and the statistical information are not in the normal range of the policy, the setting verification unit 14 notifies that the existing setting or the statistical information is abnormal. In addition, the setting verification unit 14 is characterized in that it performs following processing. When the policy is newly registered, the setting verification unit 14 performs a verification operation of checking that the existing setting and the statistical information are in the normal range of the newly registered policy in the dependency relationship. Further, when the existing setting and the statistical information are not in the normal range of the newly registered policy, the setting verification unit 14 notifies that the existing setting or the statistical information is abnormal.

Figure 4:
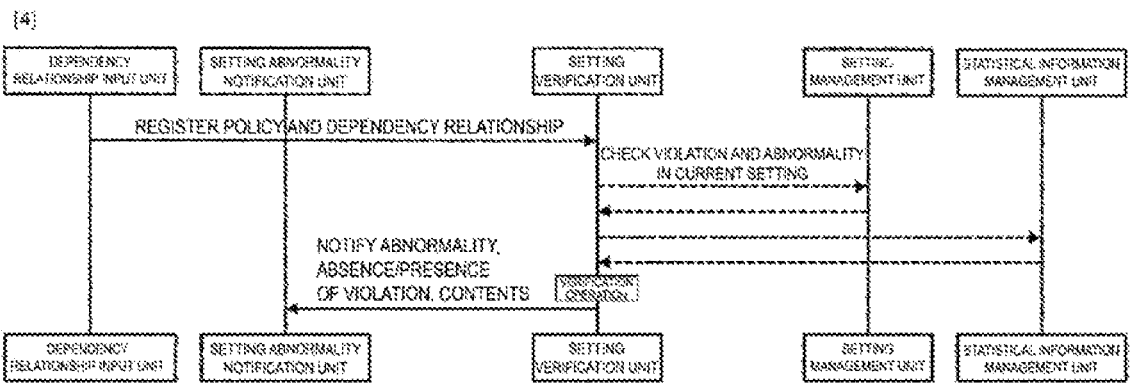
FIG. 4 is a sequence diagram illustrating operations of the network device according to the present disclosure.

FIG. 4 is a sequence diagram when a new rule is input. It is desirable that the dependency relationship and the policy input from the dependency relationship input unit 17 to the setting verification unit 14 be described by using a readily expandable language such as Datalog. In the approaches of OpenStack Congress and Fung et al., by describing the dependency relationship and the policy by using the language Datalog, a language processor can have a mechanism for searching for setting errors and policy violations, facilitating description of setting rules. In other words, because the statistical information, the dependency relationship, the policy, and the input setting are described by using the common language, the setting verification unit 14 causes the validation function of the language processor of Datalog and the like to perform the verification operation of setting abnormalities and policy violations.

For example, in a case where the dependency relationship and the policy are described in Datalog, the setting verification management unit 14a receives a program of Datalog as the dependency relationship, and sends the program to the verification unit 14b. When the setting is input from the setting management unit 12, the verification unit 14b executes the program of Datalog on the setting, and checks whether the setting is erroneous (not within the normal range of the policy).

Abnormality Detection

Figure 5:
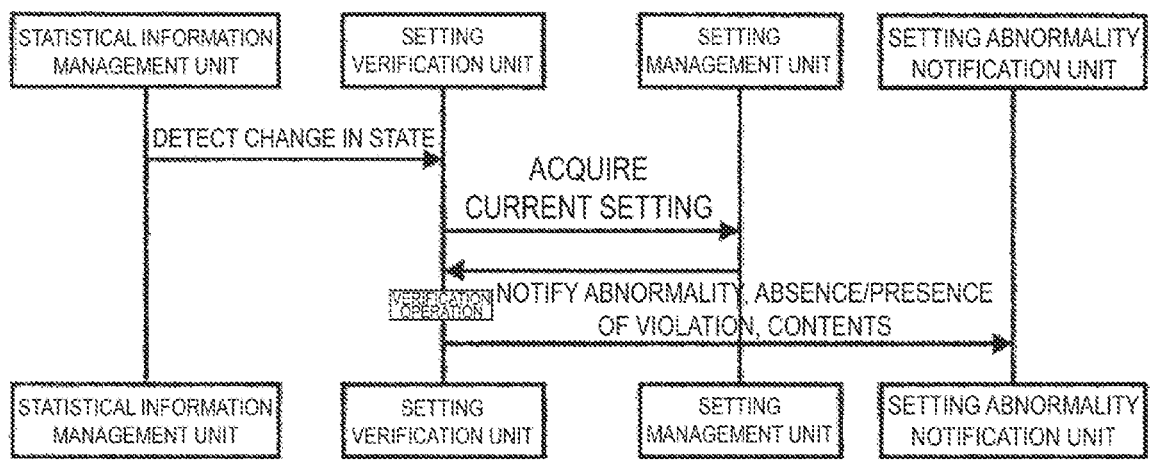
FIG. 5 is a sequence diagram illustrating operations of the network device according to the present disclosure.

The network device can perform abnormality detection in consideration of the dependency relationship and the statistical information of the plurality of functional modules 15. The setting verification unit 14 is characterized in that it performs following processing. When notified from the statistical information management unit 13 that a change in the module-related state has been detected, the setting verification unit 14 causes the setting management unit 12 to acquire the existing setting registered in the functional modules. Further, the setting verification unit 14 performs the verification operation of checking that the existing setting and the changed statistical information are in a normal range of the policy in the dependency relationship. Further, the setting verification unit 14 notifies that the module-related state is abnormal when the existing setting and the changed statistical information are not in the normal range of the policy. FIG. 5 is a sequence diagram of abnormality detection performed by the network device.

The statistical information management unit 13 acquires statistical information from each functional module 15 and the external information acquisition unit 16. Further, at the time when the statistical information changes or at regular intervals, the statistical information management unit 13 acquires the statistical information and sends the statistical information to the setting verification unit 14. The setting verification unit 14 acquires the current setting of each functional module from the setting management unit 12. Further, the setting verification unit 14 performs normality verification regarding whether the statistical information is in a normal range of the policy in consideration of the dependency relationship. The setting verification unit 14 determines that the statistical information is abnormal when the statistical information is not in the normal range of the policy. Further, when the setting verification unit 14 detects an abnormality, the setting abnormality notification unit 18 notifies the operator of the abnormality. When detecting the abnormality, the setting verification unit 14 may, for example, coordinate with another system, modify the setting, or roll back the setting. Note that the statistical information from the external information acquisition unit 16 is the data in Data Examples 1 to 3 described above.

Example 1

Figure 6:
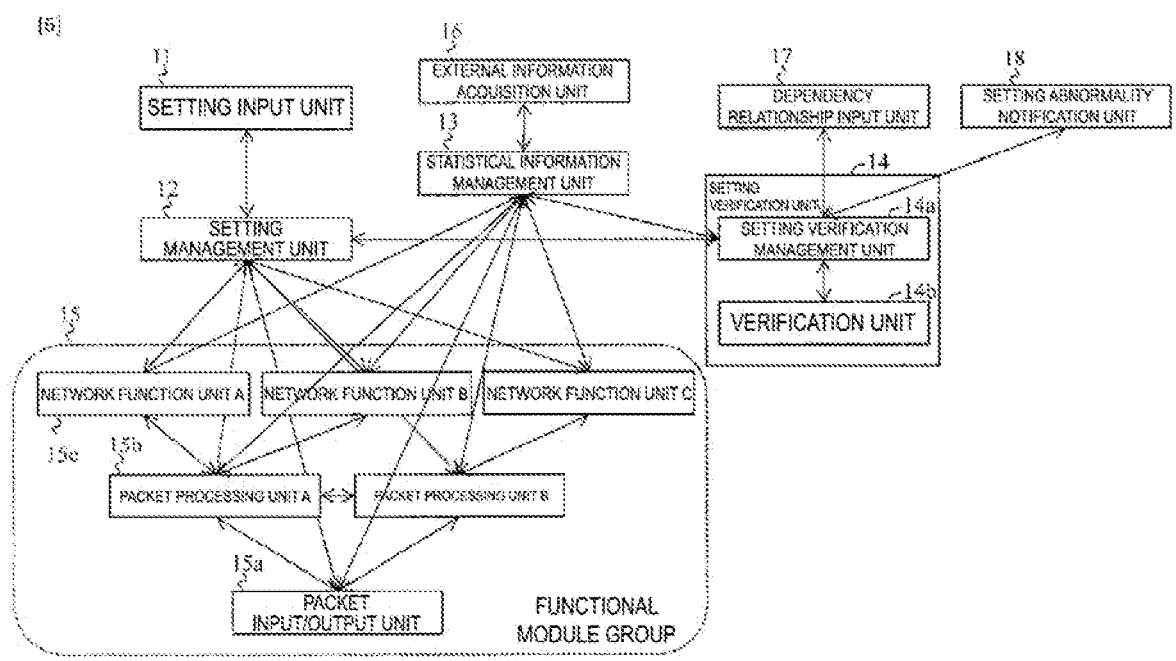
FIG. 6 is a block diagram illustrating the network device according to the present disclosure.

FIG. 6 is a diagram illustrating a specific example of the network device. The network device is configured of the functional modules (functional module group 15) for processing a plurality of protocols. The modules of the functional module group 15 are, for example, a packet input/output unit 15a, a packet processing unit 15b, and a network function unit 15c. The packet processing unit 15b may be a plurality of modules that cooperate with each other. The setting of the functional modules 15 is made from the setting management unit 12 to the network function unit 15c. The setting of the packet input/output unit 15a and the packet processing unit 15b is made via the network function unit 15c.

The statistical information management unit 13 collects statistical information about each module of the functional module group 15 (the packet input/output 15a, the packet processing unit 15b, and the network function unit 15c). The statistical information management unit 13 also acquires the data of Data Examples 1 to 3 as the statistical information from the external information acquisition unit 16. Further, the statistical information management unit 13 may acquire the following data as the statistical information from the external information acquisition unit 16.

Data Example 4) Statistical information about surroundings of a physical machine of the network device that operates (for example, locational information, weather, power supply, surrounding equipment such as a network)

For example, when the network device moves from a specified location, the network device can detect an abnormality by using locational information. The common language is Datalog. The network device is a router.

First, a rule as described below is described as a policy in the setting verification unit 14. The format follows Datalog 2.2 (see Non Patent Literature 4, for example).

error(X):-not_place(X,central_office), router_name(X).

Given that the name of a router to be verified is set as r, the setting management unit 14 enters following Fact in the setting verification management unit 14a that handles Datalog.

router_name(r)

The external information acquisition unit 16 acquires locational information of the router r using known techniques. The statistical information management unit 13 enters following Fact in the setting verification management unit 14a only while detecting the locational information that the router r is not located at a specified location (central office).

not_place (r, central_office)

Thus, when the router r is not located at CentralOffice, not_place (r, central_office) is true. Thus, when the verification unit 14b inputs a query described below, error (r) can be detected as an abnormality.

error(X)?

Note that "input a query" means that when the setting verification management unit 14a recognizes that there is a change in the setting, the statistical information, or the policy, the verification unit 14b executes the query.

In addition, when the setting "the router r can transmit and receive packets to and from the Internet" is input, following Fact is input to the setting verification management unit 14a.

internet_access(r).

Further, the policy "the state where the router r that is not located at central_office can access the Internet is abnormal" is input as the dependency relationship from the dependency relationship input unit 17 to the setting verification unit 14. The verification unit 14b can detect an abnormality according to the following rule:

error(X):-not_place (X,central_office), internet_access(X).

The network device can also detect abnormalities by the following processing, in addition to the above abnormalities. In the network device, the statistical information management unit 13 generates specific Facts depending on the CPU activity ratio and the memory activity ratio, such as cpu_usage_over60 and memory_usage_80 instead of not_place. Further, in the network device, a rule of Datalog corresponding to any policy is input from the dependency relationship input unit 17 to the setting verification unit 14.

Similarly, when there is particular Fact, the network device can handle it as policy violation in a particular setting (such as enabling DHCP, BGP, etc.).

Example 2

Figure 7:
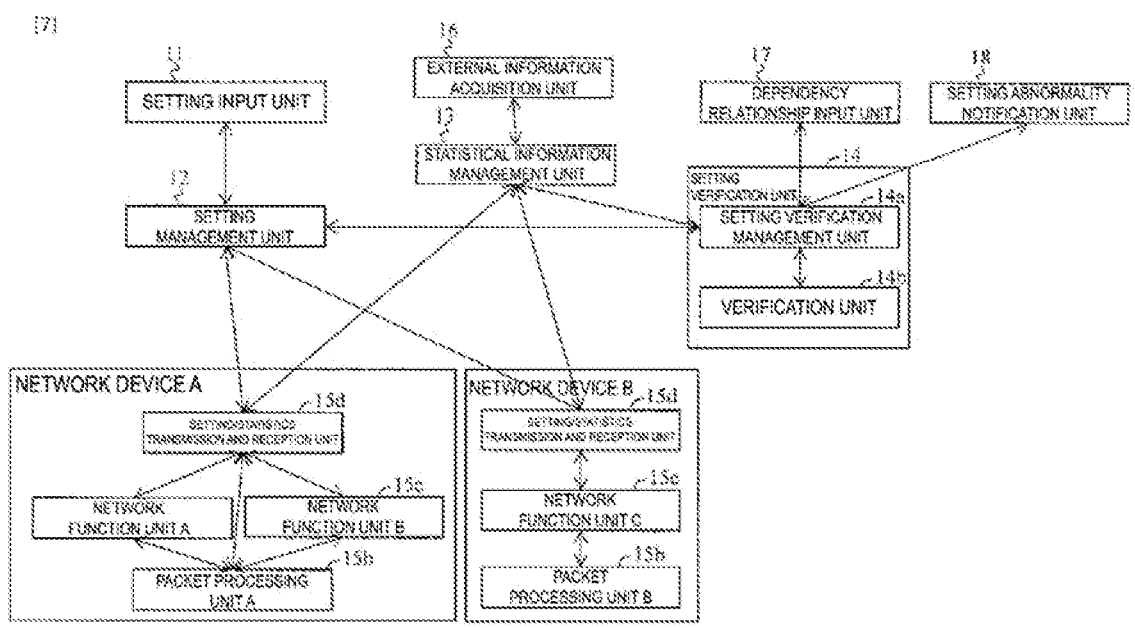
FIG. 7 is a block diagram illustrating the network device according to the present disclosure.

FIG. 7 is a diagram illustrating a specific example of another embodiment. The setting management unit 12 and the setting verification unit 14 may be external to the network device. In such a case, the network device includes a setting/statistics transmission unit 15d in addition to the network processing unit 15b and the network function unit 15c. The setting is made to each module via the setting/statistics transmission unit 15d, and statistical information about each module is transmitted to the statistical information management unit 13 via the setting/statistics transmission unit 15d. In the present example as well, the verification operation is performed as described in Example 1.

Example 3

An example of the setting information set for each functional module 15 by the setting management unit 12 will be described. The setting information is an operational setting for devices such as network devices or other servers. Examples of the setting information may include various parameters of network protocols such as group based policy (GBP), Dynamic Host Configuration Protocol (DHCP), Open Shortest Path First (OSPF), or Simple Network Management Protocol (SNMP), and various parameters of an interface and a network instance transferring packets.

Examples of the dependency relationship includes a relationship in which a setting must be made to other functional modules in order to perform a function of a certain functional module, a relationship in which one functional module and another functional module cannot be executed simultaneously, the implementation status of the functional modules to be utilized, and the activation status of functions. Examples of the dependency relationship include the following relationships. The first example is a relationship in which unless a VLAN is set for an interface, a functional module identifying the VLAN and transferring packets cannot operate correctly. The second example is a relationship in which OSPF, Routing Information Protocol (RIP) and the like should not be performed simultaneously.

The policy is a policy in the network operation. Examples of policies include a policy in which access to the Internet should not be made from a certain device or a certain interface, a policy in which the head office communicates with branches through a VPN, and a policy in which communication to a certain network in one organization from another organization is prohibited. According to the present disclosure, whether the policy is violated is described in Datalog or the like.

FIG. 8 is an example of settings of Lagopus Router. A first paragraph describes settings for an interface if0, a second paragraph describes settings for an interface if1, and a third paragraph describes settings for a network instance vrf1.

Here, a case in which there is inconsistency in the settings will be described. For example, it is assumed that settings illustrated in FIG. 9 are input. FIG. 9 illustrates an example in which the settings in the second paragraph (if1) of FIG. 8 are not described. As illustrated in FIG. 9, when the setting of describing "interface if1" after "network-instance" (indicated by a bold underline) is attempted to be input to the functional module despite that if1 is not declared as an interface, the setting verification unit 14 recognizes in the verification operation that the interface that is not created is set as a network-instance. Further, the setting verification unit 14 notifies the setting abnormality notification unit 18 of the setting abnormality. In addition, the setting verification unit 14 also notifies the setting abnormality notification unit 18 of the setting abnormality when the settings for achieving the functions in the modules are not completed.

Example 4

FIG. 10 illustrates an example in which the setting information set from the setting management unit 12 to each of the functional modules 15 is determined to be abnormal in light of the dependency relationship. In the present example, the dependency relationship "whether a setting can be made depends on the device type".

FIG. 10 is also an example of settings of Lagopus Router. The setting "set network-instances network-instance vrf1 config type L3VRF" is made in a third paragraph of the settings in FIG. 10, so that the type is set to L3VRF. The type L3VRF has a dependency relationship in which a VLAN cannot be set for the network instance. However, a fourth row of the paragraph includes the setting of a VLAN that cannot be processed in the network instance of this type "set network-instances network-instance vrf1 vlans vlan 100 config status ACTIVE".

As illustrated in FIG. 10, when the setting that is inconsistent with the type of the network instance (an unacceptable setting in terms of the dependency relationship) is attempted to be input to the functional modules, the setting verification unit 14 recognizes in the verification operation that the function that is inconsistent with the type is set for the network instance. Further, the setting verification unit 14 notifies the setting abnormality notification unit 18 of the setting abnormality (error in the dependency relationship of the setting). As the dependency relationship, the setting verification unit 14 also holds a relationship in which a function to be set, such as BGP or OSPF, is not implemented in the setting-related functional module, a relationship in which activation is not made based on a price plan or the like, and a relationship in which an operator who inputs a setting has no authority. Then, the setting verification unit 14 notifies the setting abnormality unit 18 of an unacceptable setting as an abnormality.

Effects Achieved by the Invention

The network device according to the present disclosure can verify not only input setting contents, but also the validity of the setting in consideration of the dependency relationship between functional modules, the statistical information, and the external environment.

The network device according to the present disclosure enables a policy to be easily described by using a simple language such as Datalog.

The network device according to the present disclosure enables a policy to be added dynamically.

Points of the Invention

The present disclosure is characterized in that it includes the setting management unit and the statistical information management unit in order to perform setting verification and abnormality detection in consideration of a dependency relationship and statistical information of a plurality of different functional modules. According to the present disclosure, it is possible to easily and dynamically add a rule (policy) of the setting verification or the abnormality detection in consideration of the dependency relationship and the statistical information of the plurality of different functional modules. Thus, the approach of the present disclosure can save time and effort for the development of a new module. Note that according to the present disclosure, by performing the setting verification and the abnormality detection in consideration of not only the statistical information about each functional module, but also information about the surrounding environment acquired from the external information acquisition unit, setting errors can be found, which also improves the security and prevents abnormalities of the device. Further, according to the present disclosure, it is possible to eliminate a fatal setting by providing verification information and locational information. Further, according to the present disclosure, an overload and the like can be addressed by acquiring temperature and humidity.

INDUSTRIAL APPLICABILITY

The network device according to the present disclosure may apply techniques such as machine learning or deep learning to the above-described verification operation.

REFERENCE SIGNS LIST

11: Setting input unit
12: Setting management unit
13: Statistical information management unit 14: Setting verification unit
14a: Setting verification management unit
14b: Verification unit
15: Functional module, functional module group
15a: Packet input/output unit
15b: Packet processing unit
15c: Network function unit
15d: Setting/statistics transmission unit
16: External information acquisition unit
17: Dependency relationship input unit
18: Setting abnormality notification unit

The invention claimed is:

1. A network device including a plurality of functional modules for processing a plurality of respective protocols, the network device comprising:
a processor; and
a storage medium having computer program instructions stored thereon, when executed by the processor, perform to:
manage an existing setting registered in the functional modules and a new setting to be newly registered in the functional modules by using a common language;
acquire statistical information about a module-related state related to the functional modules and manage the acquired statistical information by using the common language; and
manage a dependency relationship between the functional modules and a policy of a network by using the common language, perform a verification operation of checking that the new setting is in a normal range of the policy in relation to the dependency relationship, the existing setting, and the statistical information, and input the new setting to the functional modules when the new setting is in the normal range of the policy.

2. The network device according to claim 1, wherein when the dependency relationship is newly registered, wherein the computer program instructions further performs a verification operation of checking that the existing setting and the statistical information are in a normal range of the policy in the newly registered dependency relationship, and notifies that the existing setting or the statistical information is abnormal when the existing setting and the statistical information are not in the normal range of the policy.

3. The network device according to claim 1, wherein when the policy is newly registered, the computer program instructions further performs a verification operation of checking that the existing setting and the statistical information are in a normal range of the newly registered policy in the dependency relationship, and notifies that the existing setting or the statistical information is abnormal when the existing setting and the statistical information are not in the normal range of the newly registered policy.

4. The network device according to claim 1, wherein when receiving a notification that a change in the module-related state is detected, the computer program instructions further perform to acquire the existing setting registered in the functional modules, performs a verification operation of checking that the existing setting and the changed statistical information are in a normal range of the policy in the dependency relationship, and notifies that the module-related state is abnormal when the existing setting and the changed statistical information are not in the normal range of the policy.

5. A method for setting a network device including a plurality of functional modules for processing a plurality of respective protocols, the method comprising:
managing an existing setting registered in the functional modules and a new setting to be newly registered in the functional modules by using a common language;
performing statistical information management by acquiring statistical information about a module-related state related to the functional modules and managing the acquired statistical information by using the common language; and
performing setting verification by managing a dependency relationship between the functional modules and a policy of a network by using the common language, performing a verification operation of checking that the new setting is in a normal range of the policy in relation to the dependency relationship, the existing setting, and the statistical information, and inputting the new setting to the functional modules when the new setting is in the normal range of the policy.

6. The network device setting method according to claim 5, wherein the step of performing the setting verification includes performing, when the dependency relationship is newly registered, a verification operation of checking that the existing setting and the statistical information are in a normal range of the policy in the newly registered dependency relationship, and notifying that the existing setting or the statistical information is abnormal when the existing setting and the statistical information are not in the normal range of the policy.

7. The network device setting method according to claim 5, wherein the step of performing the setting verification includes performing, when the policy is newly registered, a verification operation of checking that the existing setting and the statistical information are in a normal range of the newly registered policy in the dependency relationship, and notifying that the existing setting or the statistical information is abnormal when the existing setting and the statistical information are not in the normal range of the newly registered policy.

8. The network device setting method according to claim 5, wherein the step of performing the setting verification includes causing, when a notification that a change in the module-related state is detected is received in the step of performing the statistical information management, the existing setting registered in the functional modules to be acquired, performing a verification operation of checking that the existing setting and the changed statistical information are in a normal range of the policy in the dependency relationship, and notifying that the module-related state is abnormal when the existing setting and the changed statistical information are not in the normal range of the policy.

* * * * *